E. BROTHERS.
MACHINE FOR USE IN THE MANUFACTURE OF BOOTS AND SHOES.
APPLICATION FILED AUG. 7, 1908. RENEWED JUNE 29, 1914.

1,135,948.

Patented Apr. 13, 1915.
5 SHEETS—SHEET 1.

E. BROTHERS.
MACHINE FOR USE IN THE MANUFACTURE OF BOOTS AND SHOES.
APPLICATION FILED AUG. 7, 1908. RENEWED JUNE 29, 1914.

1,135,948.

Patented Apr. 13, 1915.
6 SHEETS—SHEET 3.

WITNESSES.
Elizabeth C. Coupe
Edith C. Holbrook

INVENTOR.
Eli Brothers
By his Attorney,
Nelson M. Howard

E. BROTHERS.
MACHINE FOR USE IN THE MANUFACTURE OF BOOTS AND SHOES.
APPLICATION FILED AUG. 7, 1908. RENEWED JUNE 29, 1914.

1,135,948.

Patented Apr. 13, 1915.

E. BROTHERS.
MACHINE FOR USE IN THE MANUFACTURE OF BOOTS AND SHOES.
APPLICATION FILED AUG. 7, 1908. RENEWED JUNE 29, 1914.

1,135,948.

Patented Apr. 13, 1915.
5 SHEETS—SHEET 5.

UNITED STATES PATENT OFFICE.

ELI BROTHERS, OF LYNN, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,135,948.   Specification of Letters Patent.   Patented Apr. 13, 1915.

Application filed August 7, 1908. Serial No. 447,398. Renewed June 29, 1914. Serial No. 848,065.

*To all whom it may concern:*

Be it known that I, ELI BROTHERS, a citizen of the United States, residing at Lynn, in the county of Essex and Commonwealth of Massachusetts, have invented certain Improvements in Machines for Use in the Manufacture of Boots and Shoes, of which the following description, in connection with the accompanying drawings, is a specification, like reference characters on the drawings indicating like parts in the several figures.

This invention relates to machines for use in the manufacturing of boots and shoes to work the upper over the last and the invention is herein shown as embodied in a machine for pulling over and lasting shoes.

An object of the invention is to improve and simplify machines heretofore known and particularly machines of the type shown in my prior application Serial No. 441,126, filed June 30, 1908.

A very important feature of this invention consists in a novel construction and arrangement of the devices for pulling the upper and laying it over the last. This feature is herein shown as embodied in grippers which are adapted to seize and pull the upper and then to move relatively to the last to force the marginal portion of the upper into lasted position upon the shoe bottom. In the construction shown these grippers are provided with upper gripping faces and also with an upper wiping face and in their movement over the shoe bottom the wiping face is caused to rub or wipe the upper inwardly from the edge of the innersole and force it smoothly into lasted position on the shoe bottom. The grippers are preferably curved to embrace the toe portion of the shoe and to seize and pull the upper at the opposite sides and the toe end of the shoe. In grippers so formed the wiping face is also curved to act upon the end and the two sides of the toe portion of the shoe. Preferably also the gripper jaws are formed in sections which are relatively movable to permit the actuation of the gripping and wiping members inwardly from the opposite sides of the shoe while they move lengthwise of the shoe whereby said members can close in over the shoe bottom for forcing the upper inwardly simultaneously from the different portions of the forward part of the shoe. When the grippers are to be used in making shoes having shouldered innersoles or soles the wiping surface is preferably formed and arranged to force the upper into the angle between the shoulder and the feather or relatively thin marginal portions of the innersole and into position to be bound into said angle by a strand of wire or tape. It is characteristic of the preferred construction and arrangement of the machine that the said wiping face or wiper and the last are relatively actuated so that the wiper approaches the shoe bottom obliquely by a movement downwardly and inwardly to force or jam the upper down upon the feather and into the angle as distinguished from a simple wiping movement in a plane parallel with the shoe bottom.

In the preferred construction the grippers have substantially continuous gripping and wiping faces and are curved on a longer radius than the adjacent edge of the last. In their gripping and pulling position the grippers are located outwardly from the edge of the last so that they may receive the upper in its normal, outwardly flared position as it is applied loosely over the toe end of the last. This enables the forward portion of the upper to be readily inserted between the jaws of the grippers without wrinkling or folding it and provides for pulling the upper outwardly from the sides of the last. This is of great advantage in a pulling-over and lasting machine because it facilitates the relative adjustment of the upper and last for correctly positioning the upper in the pulling-over operation and for other reasons more fully explained in said prior application.

The present invention has the further advantage that the grippers themselves close inwardly over the last bottom by a movement relatively to the last both lengthwise and transversely thereof while holding the upper under tension and wipe and press the upper into lasted position upon the inner-sole without giving any opportunity for the formation of puckers or wrinkles. The illustrated grippers comprise inner and outer jaws each formed in a plurality of sections adapted for relative movement to permit the grippers to close over the last bottom by a movement both lengthwise and transversely of the last. The wipers are preferably formed integral with or attached to one jaw of the grippers and as herein shown consist of wiping faces formed upon one of the curved sectional jaws. By so forming the wipers integral with or attached to the grippers shorter uppers can be pulled over and lasted without liability of the tension being relaxed before the upper is fully worked into lasted position. The gripping faces are inclined outwardly from the last to facilitate the insertion of the upper in its normal outwardly flared relation to the last, and the wiping face is formed on the outer jaw, or the jaw that engages the outer face of the upper, and upon the opposite side thereof from the inclined gripping face. As the jaws close in over the shoe bottom the upper, which is held under tension and without wrinkles by the continuous gripping faces, is bent over the edge of the jaws and under the wiping faces between which and the last bottom or the feather of the innersole it becomes clamped. The upper gradually adjusts itself to the curvature of smaller radius as the jaws close in with the upper held under tension so that it is smoothly conformed to the contour of the side and edge faces of the last and the pressure which may be exerted between the wiping faces and the last molds or crimps the upper into smoothly lasted shape on the last bottom.

When the upper is to be secured by a binder of wire or the like the edge of the outer jaw between the gripping and the wiping faces may advantageously be provided with binder retaining means. The jaw is herein shown as having a binder groove arranged to position a tape or wire for binding the upper into the angle between the feather and the shoulder of the innersole. Tack driving devices are preferably arranged for movement with the jaws as the latter close in over the shoe bottom whereby said devices will be automatically positioned transversely of lasts of different widths.

It is a new feature in machines of this class to position the tackers automatically by the wipers, and a further feature consists in relatively arranging the tacker and the binder so that one of the tacks will be driven at the outer side of the binder in position to serve as an anchor about which the binder may be secured. By this arrangement the operator may grasp the two ends of the binder, draw the binder tightly about the shoe before the shoe is released from the wipers, and then bend the ends outwardly about the stem of the anchor tack which will hold the binder from slipping until opportunity is given for more securely fastening the binder.

In accordance with a feature of this invention pushers are provided which are arranged for movement between two adjacent tackers to press the upper into position to receive the tacks with certainty. The pushers may be actuated automatically when the grippers release the upper to permit them to advance and preferably they will be retracted automatically when the grippers are again closed. Yielding last supporting and upper clamping devices are preferably mounted for movement with the wiper to hold the upper from slipping back and the last from yielding when the grippers are opened and the tacks driven.

These and other features of the invention including certain details of construction and combinations of parts will then be more fully explained in connection with the following description of a machine embodying the invention and will be more particularly pointed out in the claims.

The frame of the machine comprises a column adapted to rest on the floor and a head which carries the devices for operating upon the shoe. The column has on its front face a guideway for a vertically movable slide 2 that carries a pinion in engagement with rack teeth formed on the column. A handle 4 on the shaft of the pinion provides means for raising and lowering the slide. A pawl 3 carried by the lever engages a ratchet that turns with the pinion for locking the slide in position. In the front face of the slide 2 is formed a transverse guideway for a block 5 which may slide freely and which has a forwardly extending arm that supports the rest 6 for receiving the heel portion of a shoe. The rest is movable in the block 5 from and toward the column of the machine and may be secured in adjusted position by a clamping screw having a handle 8. The described mechanism is adapted to support a shoe in upright position or toe upward with the top and side faces of the shoe in position to be readily inspected by the operator. The devices which will be described for operating upon the shoe are so arranged that the operator may have at all times an unobstructed view of the upper on the top and side faces of the last.

Figure 3:
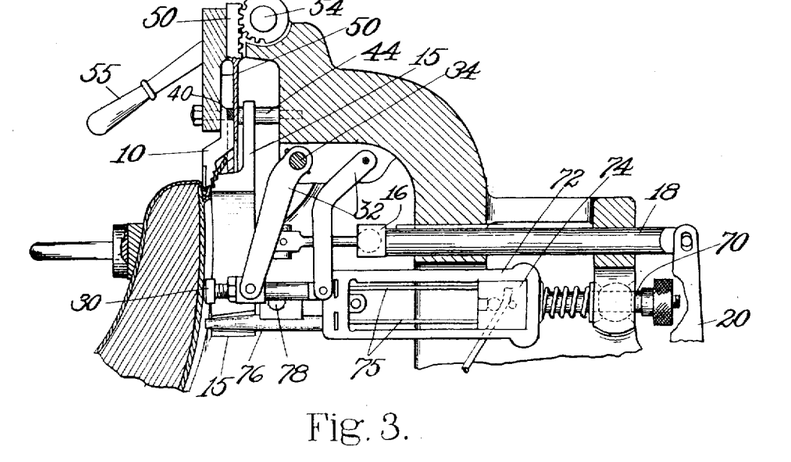
Fig. 3 is a central vertical section of the upper portion of the machine.

The devices for operating on the shoe comprise the jaw 10 formed in a plurality of sections, herein shown as two, and mounted for movement edgewise in a vertical plane, but fixed against other movement. The jaw 10 has upon its rear side a corrugated gripping face inclined upwardly and outwardly, see Fig. 3, with relation to a shoe presented in position to be operated upon. Coöperating with the jaw 10 is a jaw 15 having a similarly formed gripping face and connected by a pivoted link and universal joint to a cross head 16 on a plunger 18. The plunger is pivoted to a bell crank 20 connected by a rod 22 to a treadle 24. By means of the treadle and described connections a movement is imparted to the jaw 15 toward and from the jaw 10 for gripping and releasing the shoe upper.

An abutment 30 is provided for engaging the last bottom to effect relative movement between the last and the grippers for putting the upper under tension. The abutment, which is adjustable upon its shank, is supported by parallel links 32 from the head of the machine, one of the links being rigidly fastened to a rockshaft 34 having an arm 35 that is connected by a rod 36 to the hand lever 38 fulcrumed on the column and located in convenient position for the operator to manipulate with one hand while with the other hand he may shift the position of the shoe or of the last within the upper as his observation may indicate is desirable for pulling the upper and positioning the last and upper relatively. It will be understood from the foregoing description and the drawings that the grippers embrace the forward portion of the shoe from one side around the toe to the other side in their normal or open position. The jaws are curved in substantial similarity to the general shape of the forward portion of a shoe and in their normal or open position are arranged to receive the upper in the outwardly flared condition which it assumes with relation to the forward portion of the last when it is placed loosely over the last. Because it is gripped in this outwardly flared position the upper is pulled, by the movement of the last, in a direction obliquely out from the side faces of the last so that it is put under tension over the top face of the last with a minimum frictional resistance caused by contact with the last. The construction and arrangement are such that the operator may move the last upon the abutment in any desired direction—for example, he may turn it by swinging the heel end of the last laterally to adjust the upper and last relatively longitudinally about the last for straightening the toe tip seam or he may swing the heel end of the last forwardly or backwardly to vary the forward pull on the upper. It is also practicable to roll or to slide the last laterally upon the abutment for relatively adjusting the upper and last transversely of the shoe and the hand lever 4 may be employed for thrusting the last forwardly or upwardly into the pulled upper. It will be observed that the arrangement is such that the operator may conveniently move the last with relation to the gripped upper as described while he retains his hold upon the lever 38, which enables him to vary the pull upon the upper from time to time while the adjustments are being effected and so conform the upper in its adjusted position to the general contour of the last.

Figure 4:
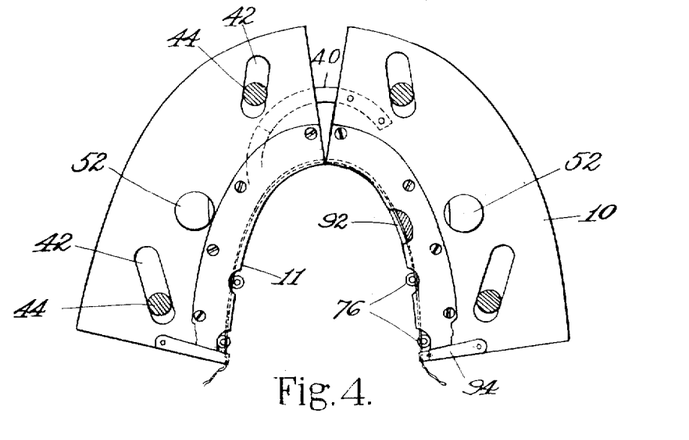
Fig. 4 is a front view of the gripping and wiping jaws on an enlarged scale, the wiping face being formed in this view by a removable plate that can be replaced by one having a differently shaped edge for shoes of different shapes.
Figure 5:
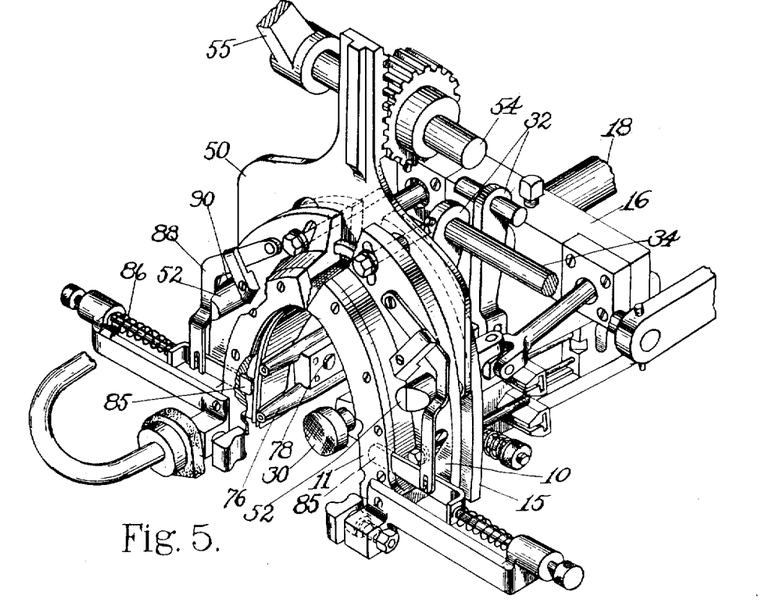
Fig. 5 is a perspective view of the mechanism comprised in the upper portion of the machine.

The jaw 10 is formed on its front side with a wiping face adapted to force the upper inwardly over the marginal portion of the shoe bottom and into lasted position with relation to the shoe innersole. This wiping face may be an integral suitably formed face of the jaw or it may be a removable plate 11, as shown in Figs. 4 and 5, which can be readily replaced by a wiper plate of a shape adapted to a different style of last. To adapt the jaw 10 for wiping the upper into lasted position it is, as before mentioned, movable in a vertical plane. The two sections of the jaw are connected by a link 40, as shown in Figs. 4 and 5, and are provided with slots 42 that receive studs 44 fixed in the head of the machine. These slots are curved with relation to the meeting point of the two sections of the jaw to cause the jaws to turn around a center located at or about said meeting point as the jaws are moved downwardly or lengthwise of the shoe. For imparting the described downward and inwardly closing movement to the sections of the jaw 10 a forked plate 50 has one arm connected at its lower end to each section of the jaw by a bolt or stud 52 which extends through an elongated opening in the jaw section. At its upper end the plate is provided with rack teeth adapted to engage a pinion formed on the rockshaft 54, which has a hand lever 55. The lever 55 is arranged on the opposite side of the machine from the hand lever 38 whereby the operator with his left hand may move the jaws for forcing the upper inwardly over the shoe bottom while with his right hand he may control the postion of the last, permitting the last to be moved toward the wipers as the wipers close and bend the upper inwardly over the edge of the last. This is important as it enables the operator to hold the upper under tension while obtaining the stock required for bending the upper over the edge of the last and laying it down in lasted position. It will be observed that the result of the inward movement of the jaws and the backward movement of the last is an oblique relative movement of the jaws and last so that the jaws serve to drive the upper in an inclined direction into the angle between the feather and the shoulder of a shouldered sole or innersole. If in any given shoe the upper does not stretch as much as usual the grip may be relaxed during the closing of the wipers to permit the upper to slip between the jaws to the extent required by the operation of the wipers. A toe clamp 60 constructed and arranged for operation like that shown in my prior application before mentioned may be employed if desired to force the last against the wiping faces of the jaws for crimping or molding the upper into lasted position on the bottom of the shoe. The wipers preferably support yieldingly side clamps 62 which engage the shoe at opposite sides of the ball and hold the upper from slipping back at this point where there is often the greatest tension upon the stock.

Figure 1:
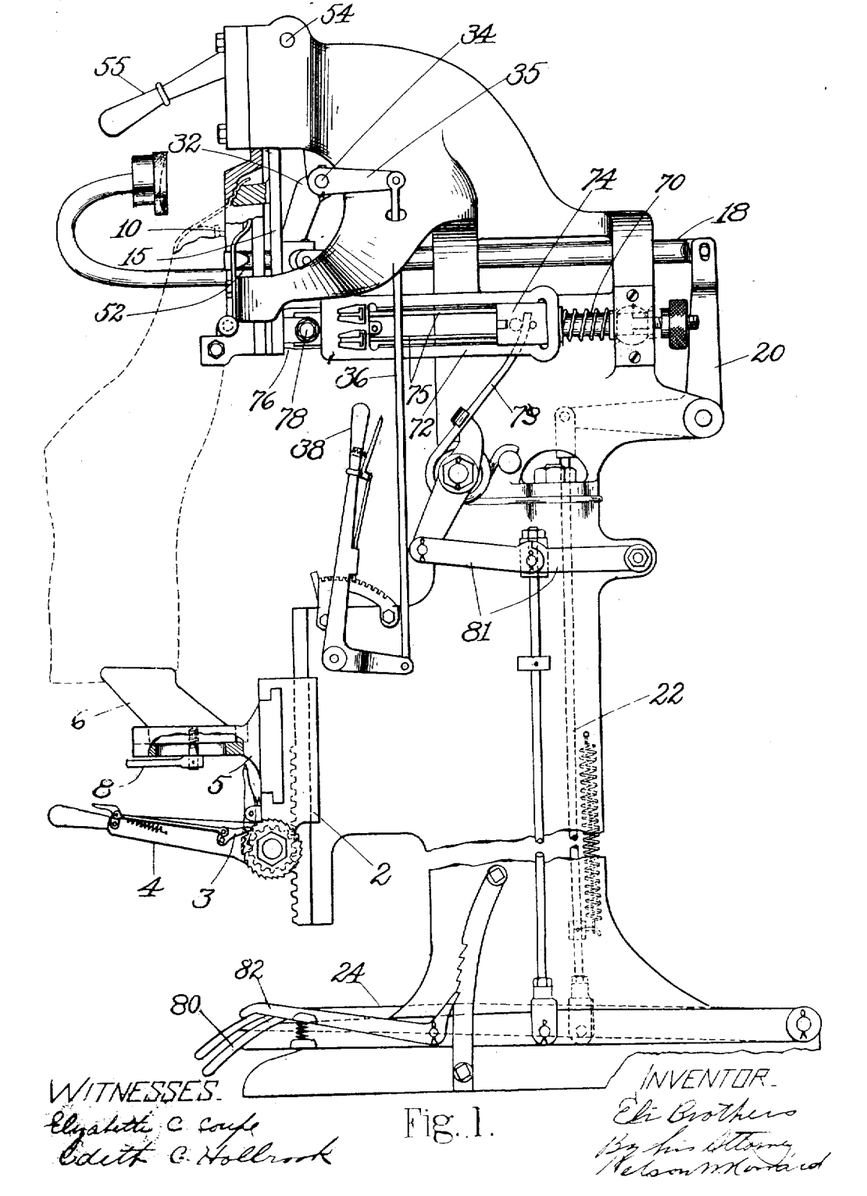
Figure 1 is a side elevation of a machine embodying this invention in a preferred form.
Figure 2:
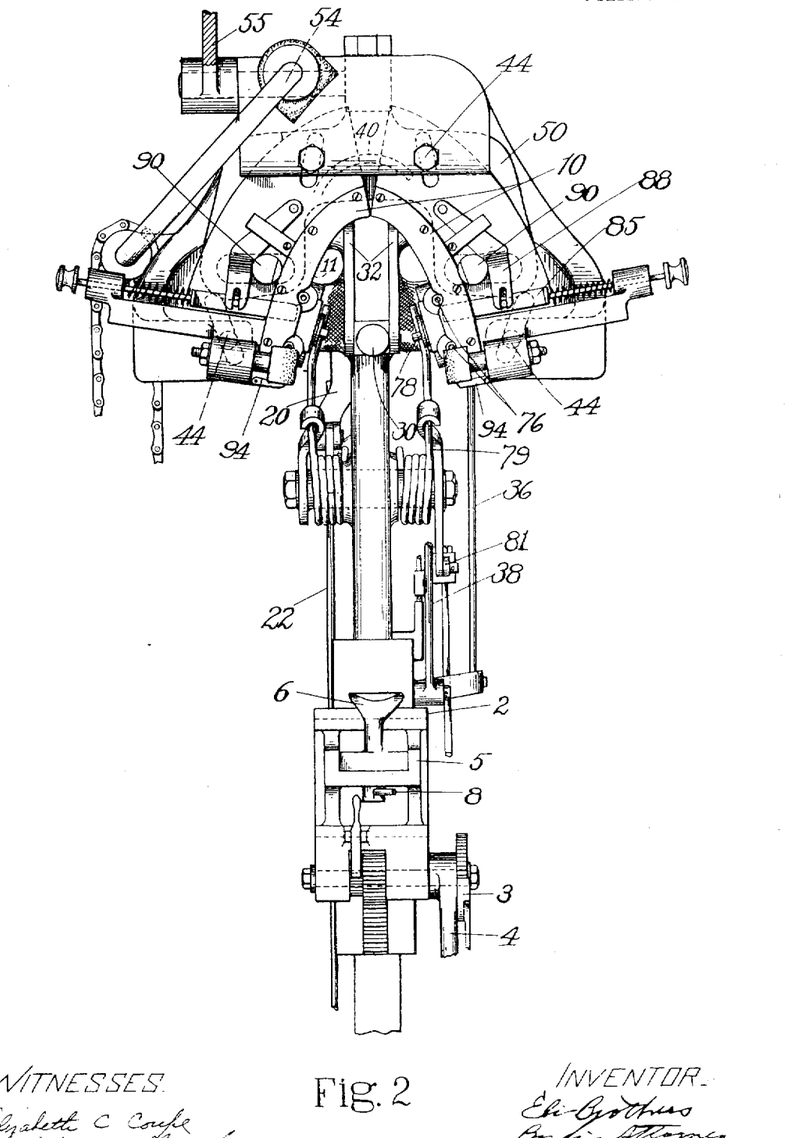
Fig. 2 is a front elevation.
Figure 6:
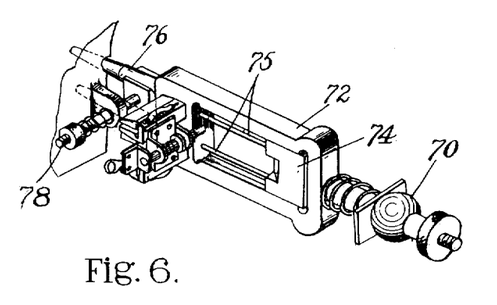
Fig. 6 is a perspective view of the tacking mechanism in Fig. 5 from a different angle.
Figure 7:
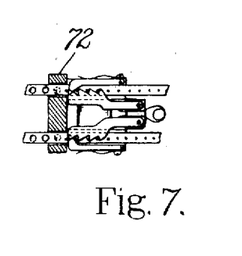
Fig. 7 is a sectional view of a portion of the tacking mechanism.
Figure 8:
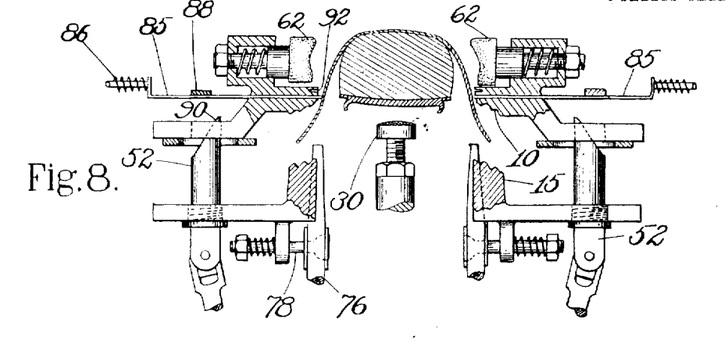
Fig. 8 is a horizontal section, partly in plan, showing the several parts in the position occupied by them immediately after a shoe has been put into position to be operated upon.
Figure 9:
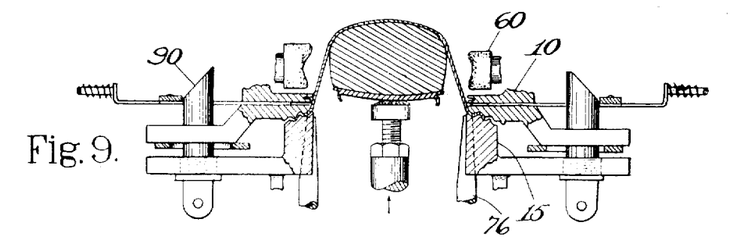
Fig. 9 represents the same parts after the grippers have been closed and the abutment actuated for moving the last to stretch the upper.
Figure 10:
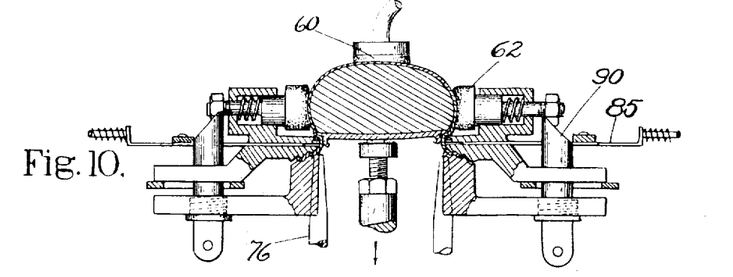
Fig. 10 shows the same parts after the combined gripping and wiping jaws have been closed in over the shoe bottom for forcing the upper into lasted position.

The tacking devices are located at each side of the machine and are duplicates of one another. The shank or support 70 is slidingly connected by a ball and socket joint near its rear end to the head of the machine and the forward portion of the support is made in the form of an open framework 72 in which the driver head 74 and the drivers 75 are guided. The nozzles 76 project forwardly from the frame 72 and are yieldingly held in notches in the inner face of the jaw 15 by the rod 78 so that the front portion of each tacking device has vertical and lateral support and is moved transversely of the machine with the jaw 15 so that it is automatically positioned with relation to the width of the shoe which is being operated upon. This provision is of special importance in making shoes which have shouldered innersoles against which the upper is forced by the wipers into position to be permanently attached to the shoulder. In making such shoes it is customary to secure the forward portion of the upper about the toe of the shoe temporarily in lasted position by a binder of tape or wire which is drawn snugly around the toe to hold the upper against the shoulder. The tacks inserted by the tacking devices serve for anchoring this binder and it is, therefore, desirable that they be postioned close to the shoulder of the innersole for holding the binder. The tacks are supplied to the tacking mechanism by devices illustrated in Figs. 6 and 7 which may be substantially like those fully described in my earlier application before mentioned and therefore need not be described herein. In their operation, which is effected by springs 79 and a foot treadle 80 connected to a toggle 81 and locked by a pawl 82, the framework 72 with the nozzles 76 and other devices carried by it is actuated forwardly until the nozzles engage the shoe and then the drivers are impelled through the nozzles to drive the tacks. Depression of the treadle again straightens the toggle 81, retracting the frame 72 and the drivers which are locked in the position in Fig. 1 by the pawl 82.

Figure 11:
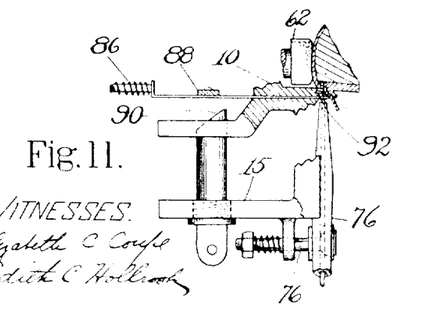
Fig. 11 illustrates the position of the parts after the grippers have been opened and while the wiping jaws are holding the upper in position to be tacked.
Figure 12:
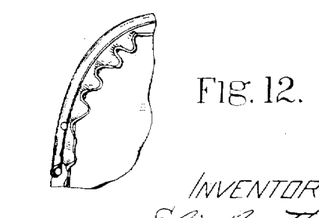
Fig. 12 is a plan of a portion of a shoe pulled over and lasted in the machine and having the upper fastened by anchor tacks and a binder.

Pushers 85 are yieldingly supported on brackets extending from the jaw 10 and are adapted to be projected through said jaw for pressing the marginal portion of the upper adjacent to the tackers inwardly over the last bottom to insure its position in the path of the drivers. The operation of these pushers is shown in Fig. 11. The shank of the pusher is surrounded by a spring 86 and the blade is supported by a lever 88 pivoted to the jaw 10 and engaged by the inclined face 90 of the sliding bolt 52. This bolt holds the pushers retracted while the jaws are closed and the upper is being pulled over and wiped into lasted position. When the jaws open and release the upper held by the wiping face of the jaw 10 the bolts are retracted and permit the springs 86 to actuate the pushers for pressing the upper into position to be tacked and for holding it during the tacking operation. The jaw 10 may be provided as shown herein with a groove 92 in its edge between the gripping and wiping faces to receive the binder and carry it into place upon the shoe. Binder positioning devices 94, which may be spring clasps or other suitable holders, are carried by the lower ends of the jaw 10 and are arranged to locate the binder at the inner side of the rear tack inserted by the tacking mechanism, as indicated in Fig. 4. Before the shoe is released from the machine the operator may engage the two ends of the binder, drawing it snugly about the shoe, and after the shoe has been taken out he can then readily wrap the ends of the binder about the anchor tacks to fasten it.

In the use of the machine the operator takes a shoe, comprising an upper and innersole assembled on the last with the upper applied loosely over the forward portion of the last, and inserts the upper between the jaws of the grippers which, by reason of their formation and position, are adapted to receive the upper in its normal condition without requiring the upper to be bent or wrinkled. The grippers are then closed by depressing their operating treadle and the heel rest is raised and, if necessary, positioned laterally and forwardly or backwardly to locate it for suitably supporting the particular size and shape of shoe being operated upon, the pawls connected to the treadle and to said lever holding the jaws and rest in the positions to which they have been moved. The workman is then free to use both hands in the further operations of the machine. The hand lever 38 connected to the bottom rest is now manipulated for forcing the last away from the grippers to stretch the upper. During this stretching operation the last may be moved in any of the described ways or other ways for shifting it within the upper to effect proper adjustment and positioning of the upper upon the last. The final movement of the last for stretching the upper may be effected after the adjustments have taken place. When the upper has thus been pulled over and suitably adjusted so that it is ready to be forced into lasted position the hand lever 55 is engaged by the left hand of the operator while he continues his hold upon the hand lever 38 connected to the abutment or bottom rest. By depressing the lever 55, whereby the jaws are moved downwardly lengthwise of the last and are closed in laterally or transversely of the last, and suitably manipulating the bottom rest by the other lever, the upper is simultaneously forced into lasted position over the entire forward portion of the last and may be pressed into the angle of a shouldered sole or innersole, as shown in the drawings. In this operation of moving the grippers inwardly to lay the upper into lasted position it is usually necessary to permit the last to move backwardly. By these relative movements of the grippers and last during which the grippers move inwardly and the last moves backwardly the upper is forced obliquely into the angle in the innersole. If it be necessary the gripper treadle may be released partially or wholly during the wiping movement in order to let the upper slip from between th jaws of the grippers. The toe rest or clamp may be manipulated if desired to force the last backwardly against the wiping face of the grippers for forming or molding the upper into its lasted position on the shoe bottom. When the upper has been satisfactorily worked into lasted position the tackers are actuated to insert the tacks at the sides of the shoe. Before the tacks are driven the grippers are fully opened and through the described connections the pushers are permitted to advance over the shoe bottom for laying and holding the upper at the inner edge of the wipers in position to receive the tacks. They may be forced inwardly by hand if necessary. One of the tacks on each side of the shoe is preferably driven at the outer side of the binder which will have been put into its groove in the wiper before the shoe is presented to the machine. While the upper is still held by the wiping face of the grippers the operator may grasp the two ends of the binder, drawing it snugly about the end portion of the shoe and bend the ends outwardly about the anchor tacks which are located at the outer side of the wire. The shoe may then be withdrawn from the machine and the ends of the binder securely wrapped about the tacks or otherwise fastened.

Having explained the nature of this invention and described a preferred construction embodying the same, I claim as new and desire to secure by Letters Patent of the United States.

1. A machine for working an upper over a last having, in combination, grippers comprising jaws curved to adapt them to operate at the curved toe portion of the shoe, and means for actuating the grippers and the last relatively to pull the upper and then actuating the grippers by a movement of said two jaws together to wipe the marginal portion of the upper into lasted position.

2. A machine for working an upper over a last having, in combination, grippers comprising coöperating jaws curved to embrace the toe portion of the shoe upper, and means for actuating the grippers and the last relatively to effect pulling of the upper, and means connected with the gripper jaws to actuate them to wipe the marginal portion of the upper into lasted position.

3. A machine for working an upper over a last having, in combination, grippers constructed and arranged to receive in its normal outwardly flared position the marginal portion of the upper at the toe end and opposite sides of the last, means to actuate said grippers and last relatively for pulling the upper, and operating means connected with said grippers to actuate them longitudinally of the shoe with an inward closing movement for wiping the upper into lasted position.

4. A machine for working an upper over a last having, in combination, grippers constructed and arranged to receive in its normal outwardly flared position the marginal portion of the upper at the toe end and opposite sides of the last, means for actuating said grippers and last relatively in a direction substantially perpendicularly to the last bottom, and means for actuating said grippers inwardly over the last bottom from the end and the opposite lateral sides of the toe of the last.

5. A machine for working an upper over a last having, in combination, sectional grippers constructed and arranged to receive the upper at the toe end and at opposite sides of the fore part of the last, means for actuating the grippers to seize and to pull the upper, and means for actuating the grippers lengthwise of the last and for relatively actuating the gripper sections transversely of the last for laying the marginal portion of the upper upon the fore part of the last bottom.

6. A machine for working an upper over a last having, in combination, curved sectional grippers comprising a jaw arranged for movement in a plane substantially parallel to the last bottom and a second jaw arranged for independent movement in a plane substantially perpendicular to the last bottom to grip the upper and then with said other jaw to lay the upper over the last bottom.

7. A machine for working an upper over a last having, in combination, grippers capable of opening and closing movement laterally over the last bottom and comprising jaws having gripping faces constructed and arranged to receive the upper at the toe end and opposite sides of the forward portion of a shoe, one of said jaws having also a wiping face and means for relatively actuating the last and that jaw for forcing the upper into lasted position.

8. A machine for working an upper over a last having, in combination, grippers comprising curved jaws adapted to receive the upper at the toe end and opposite side of the forward portion of a shoe, one of said jaws having a wiping face on one side and a gripping face on the opposite side oblique to the wiping face.

9. A machine for working an upper over a last, having, in combination, grippers comprising inner and outer jaws having their gripping faces arranged to receive in its normal outwardly flaring position an upper placed loosely over the toe portion of a last, said outer jaw having also a wiping face located on the side opposite to its gripping face and oblique thereto and adapted for use in wiping the upper into lasted position.

10. A machine for working an upper over a last, having, in combination, grippers comprising sectional jaws for gripping and pulling an upper, and means for actuating the jaws inwardly over the last bottom to carry the upper toward lasted position.

11. A machine for working an upper over a last, having, in combination, grippers comprising sectional jaws constructed and arranged to grip the upper at the toe end and opposite sides of the fore part of the last, means for actuating the grippers and the last relatively to pull the upper, and means for actuating the grippers inwardly from the end and sides of the last to carry the upper over the last bottom.

12. A machine for working an upper over a last, having, in combination, grippers comprising outer and inner jaws formed in relatively movable sections for engaging the upper about the toe portion of the last, means for relatively actuating the jaws and the last to pull the upper, and means for actuating the sectional outer jaw to wipe the upper into lasted position.

13. A machine for pulling-over and lasting shoes having, in combination, grippers provided with gripping and wiping faces, means for relatively actuating the grippers and last to pull the upper, a support for the last arranged to permit adjusting movements of the last within the upper while the upper is under tension, and means for actuating the grippers to force the marginal portion of the upper into lasted position.

14. A machine for pulling-over and lasting shoes having, in combination, grippers comprising coöperating members provided with gripping and wiping faces, means for relatively actuating the grippers and last to pull the upper, said machine having provision for relative movement of the grippers and last for adjusting the upper on the last and means for actuating the gripper members and the last relatively to work the pulled and adjusted upper into lasted position.

15. A machine for working an upper over a last having, in combination, grippers curved lengthwise of the edge of the last to receive the toe portion of an upper, means for actuating the grippers and the last relatively to pull the upper, and means for actuating the grippers to lay the upper into lasted position on the shoe bottom at the end and opposite sides of the toe.

16. A machine for working an upper over a last having, in combination, grippers having outer and inner jaws curved lengthwise of the edge of the last to receive the toe portion of an upper, said outer jaw having also a wiping face, means for actuating the grippers and last relatively to pull the upper, and means for actuating the jaws together inwardly to cause the outer jaw to wipe the upper into lasted position.

17. A machine for working an upper over a last having, in combination, grippers comprising coöperating jaws curved lengthwise of the edge of the last and provided with a wiping face, and means for actuating the jaws and the last relatively to pull the upper and to wipe it over the last bottom.

18. A machine for working an upper over a last having, in combination, grippers having curved jaws to engage the upper at the toe end and opposite sides of the fore part of the last, and means for actuating the jaws lengthwise and transversely of the last for laying the upper over the forward portion of the shoe bottom.

19. A machine for working an upper over a last having, in combination, grippers having jaws curved to engage the upper at the end and at the opposite sides of the forward portion of the last, a wiper removably attached to one of the jaws, and means for actuating said parts and the last relatively to pull the upper and wipe it over the last.

20. A machine for working an upper over a last having, in combination, grippers and a wiper detachably connected to the grippers, and means for actuating said parts and the last relatively to pull the upper and wipe it into lasted position.

21. A machine for working an upper over a last having, in combination, a wiper comprising relatively movable sections adapted to embrace the forward portion of a shoe, means for actuating the wiper to force the upper into lasted position over the shoe bottom, tackers operatively connected with the wiper sections at opposite sides of the shoe for movement therewith inwardly over the shoe bottom, and means for actuating the tackers.

22. A machine for working an upper over a last having, in combination, wiper sections arranged at opposite sides of a shoe and presenting a substantially continuous edge extending around the toe of the shoe, means for actuating the sections inwardly over the shoe bottom for forcing the upper into lasted position, tack guiding devices operatively connected with the wiper sections and movable therewith over the shoe bottom, and tack drivers associated with the guiding devices, said tacking means and wiper sections being arranged to locate and insert toe binding wire anchor tacks inside the acting edge of the wiper sections.

23. A machine for working an upper over a last having, in combination, wiper sections, tack guiding devices operatively connected with the wiper sections for movement therewith inwardly over the shoe bottom and means for independently actuating said tack guiding devices from and toward the surface of the shoe bottom.

24. A machine for working an upper over a last having, in combination, wiper plates, tack guiding devices operatively connected with the plates for having movement therewith, inwardly over the shoe bottom, means for independently actuating the guiding devices toward the shoe bottom, and means for inserting tacks through said devices.

25. A machine for working an upper over a last having, in combination, grippers, means for relatively actuating the grippers and the last to pull the upper and lay it over the last, tack guiding devices separated from the grippers and mounted for movement therewith, and means, adapted to be actuated at a time chosen by the operator relatively to the time that the grippers overlay the upper, for inserting tacks through said guiding devices.

26. A machine for working an upper over a last having, in combination, tackers movable inwardly over a shoe bottom, upper positioning devices arranged between the plane of the shoe bottom and the tackers, and means for actuating said positioning devices relatively to the tackers to lay and hold the upper against the shoe sole for the operation of the tackers.

27. A machine for working an upper over a last having, in combination, grippers for pulling an upper and laying it over and down upon the last bottom, pushers guided between the planes of the upper and lower faces of the grippers and arranged for movement to lay and hold portions of the upper in advance of the grippers down upon the shoe sole in position to be tacked, and means for tacking the upper.

28. A machine for working an upper over a last having, in combination, wipers constructed and arranged to force an upper into lasted position over a shoe bottom, and relatively narrow pushers arranged to act after the operation of the wipers and at a plurality of separate points on portions of upper in advance of the acting edge of the wipers for laying it in position to be tacked.

29. A machine for working an upper over a last having, in combination, grippers comprising relatively movable jaws adapted to work an upper over a last, a tack carrier and a driver for fastening the upper, and a pusher constructed and arranged with relation to the grippers and the tackers to be automatically advanced, when the grippers are opened, to lay and hold the upper under the tack carrier in position to be fastened, and to be retracted when the grippers are closed.

30. A machine for working an upper over a last, having, in combination, the grippers comprising coöperating members 10, 15, the tack carrier and driver 75, 76, the pusher 85 carried by one of the gripper members, and suitable actuating mechanism constructed and arranged for operation substantially as described.

31. A machine for working an upper over a last having, in combination, grippers for pulling an upper, a wiper for laying the upper over the last bottom; a tacker for fastening the upper, and a pusher arranged to be actuated in a plane between the wiper and the grippers for laying the upper at the inner edge of the wiper into position to be fastened by the tacker.

32. A machine for working an upper over a last having, in combination, a wiper adapted to lay the upper over the shoe bottom, a tacker, and means arranged to lay and hold the upper at the inner edge of the wiper in position to be fastened by the tacker.

33. A machine for working an upper over a last having, in combination, the grippers, the wiper 11, 15, the pusher 85, the tacker 75, 76, and suitable actuating mechanism constructed and arranged to operate said devices substantially as described.

34. A machine for working an upper over a last having, in combination, grippers for pulling an upper over a last, a pusher movable across the line of the upper extending between the grippers and the last, means for yieldingly pressing the pusher forwardly, means for holding the pusher in a retracted position, and connections between the last-mentioned means and the grippers for permitting the operation of the pusher to take place automatically when the grippers are opened.

35. A machine for working an upper over a last having, in combination, grippers, means for actuating the grippers lengthwise and transversely of the last to work the upper toward lasted position, and tacking devices connected with the grippers for movement therewith whereby the tacking devices are positioned automatically with relation to the portion of the overworked upper to be secured thereby.

36. A machine for working an upper over a last having, in combination, grippers movable longitudinally and transversely of a last for working the upper toward lasted position, tacking devices movable with the grippers into position to secure the upper, an actuator for the tacking devices, and a universal joint connection between the tacking devices and their actuator.

37. A machine for working an upper over a last having, in combination, a tacker movable bodily from and toward the face of the work and comprising a driver bar and an actuator arranged to advance the tacker toward the work until it contacts with the work and then to advance the driver for inserting the tack.

38. A machine for working an upper over a last having, in combination, a tacker, a support in which the tacker is mounted for movement perpendicularly toward and from the face of the work said tacker comprising a driver bar, and a yielding actuator constructed and arranged to move the tacker in its support until it is stopped by the work and thereafter to insert the tack.

39. A machine for working an upper over a last having, in combination, a tacker movable bodily toward the surface of the work and comprising a driver bar, a yielding actuator connected to the driver bar and adapted through said connection to impel the tacker and the bar toward the work, and other means acting upon the tacker to assist in effecting its movement over the work.

40. A machine for working an upper over a last having, in combination, a tacker, a spring for actuating the tacker toward the face of the work, a driver bar, and an actuator for the driver bar arranged to operate by movement in one direction for retracting the driver bar and moving the tacker away from the work and to operate during its movement in the other direction to actuate the bar for inserting a tack.

41. A machine for working an upper over a last having, in combination, end lasting wipers having a groove in their inner edge to receive a binder of wire or other continuous material, tackers arranged to insert tacks in predetermined relation to the edge of the wiper, and means for positioning the end portion of the binder at the inner side of the tack-receiving point on the shoe bottom.

42. A machine for working an upper over a last having, in combination, an end lasting wiper having a groove to receive a binder and a tacker arranged to insert a tack between the binder and the adjacent portion of the edge of the wiper.

43. A machine for working an upper over a last having, in combination, end lasting wipers constructed and arranged to position a binder about the toe portion of a shoe, and tackers arranged with relation to the wipers at opposite sides of the shoe to insert anchor tacks between the binder and the adjacent portion of the edge of the wiper.

44. A machine for working an upper over a last having, in combination, curved sectional toe grippers movable lengthwise and transversely over the last bottom, and manually controlled devices for producing relative movement of the grippers and the last in a direction substantially perpendicular to the plane of the last bottom.

45. A machine for working an upper over a last having, in combination, curved sectional grippers and actuating devices whereby the grippers may be moved inwardly over the last bottom and the last simultaneously moved toward the grippers.

46. A machine for working an upper over a last having, in combination, grippers for pulling an upper to lay it over a last, the grippers being provided with a wiping face, means whereby the grippers may be actuated over the last bottom, and means whereby the last may be moved perpendicularly to its bottom face.

47. A machine of the class described having, in combination, means for forcing an upper into lasted position about the toe portion of a last and holding the upper, said machine having provision for placing a a binder about the lasted end of the shoe, and means for inserting anchor tacks at opposite sides of the shoe between the edge of the shoe and the binder whereby the binder may be tightened and the ends bent outwardly about said tacks to anchor it while the upper is held by the lasting means.

48. A machine of the class described having, in combination, grippers comprising a jaw provided with a curved wiping face, and means for actuating said grippers and the last relatively to pull an upper and to wipe it into lasted position over a curved portion of the edge of a last.

49. A machine for working an upper over a shoe bottom having, in combination, a last support, wiper plates, and means for relatively actuating the last and the wiper plates whereby the plates approach the shoe in a direction inclined inwardly from the edge of the shoe bottom and downwardly toward the shoe bottom to drive the upper into the angle between the shoulder and feather of a shouldered innersole.

50. A machine for working an upper over a shoe bottom having, in combination, a last support, wiper plates shaped to embrace the toe portion of the shoe, and means for relatively actuating the last and the plates whereby the plates close inwardly over the edge of the shoe and simultaneously move obliquely toward the plane of the shoe bottom.

51. A machine for working an upper into lasted position over the forward portion of a shouldered innersole having, in combination, a last support, means for pulling the upper at the opposite sides and the toe of the shoe, and lasting devices movable obliquely downwardly and inwardly to force the upper into the angle between the shoulder and the feather of the innersole.

52. A machine for working an upper over a last having, in combination, upper holding members curved to present continuous acting faces to receive the marginal portions of the upper at the end and opposite sides of the toe of the shoe, means for actuating said members to seize the upper, means for actuating said members and the last relatively to stretch the upper over the toe portions of the last, and means for actuating the member that engages the outer face of the upper inwardly at its opposite ends and rearwardly over the last bottom to lay the upper into lasted position, the cooperating member that engages the upper materials on the inner side being constructed and mounted to accompany the other member in its said overlaying movements.

53. A machine for working an upper over a last having, in combination, grippers comprising cooperating jaws and adapted to work an upper over a last, a tack carrier and driver, and a pusher carried by one of said jaws and movable independently thereof to lay the upper in position to be tacked.

54. A machine of the class described having, in combination, grippers for working an upper over a last, a tacker, and a pusher carried by a member of the grippers and movable relatively to said member to lay the upper in position to be tacked.

55. A machine of the class described having, in combination, grippers comprising relatively movable jaws, a wiper carrier by one of said jaws, a tacker, and a pusher carried by said jaw and movable independently thereof to lay and hold the upper in position to be fastened by the tacker.

56. A machine for working an upper over a last having, in combination, toe grippers comprising jaws arranged in a line extending from one corner of the toe of the last around the end of the toe to the other corner to receive the curved toe portion of the upper, and operating mechanism for causing the grippers to seize the upper, move the grippers and the last relatively to pull the entire forward portion of the upper over the top of the toe of the last, and then moving the grippers and the last relatively to cause the jaws to gather the upper inwardly over the end and corners of the toe of the last and lay it into lasted position over the innersole upon the last bottom.

57. A pulling-over and lasting machine having, in combination, grippers arranged to seize the upper at the end and sides of the toe portion of a last, and operating mechanism for relatively moving the grippers and the last to pull the upper over the last and hold the upper under tension for inspection of the shoe, said machine being arranged to allow relative movement of the last and the grippers for adjusting the upper about the last, and the jaws of said grippers which engage one side of the upper having a construction and arrangement adapting them to coöperate with the last during a further movement of said mechanism to wipe the upper backwardly and inwardly into lasted position over the end and corners of the toe portion of an innersole on the last bottom.

58. A machine for working an upper over a last having, in combination, a last rest, toe grippers comprising inner and outer jaws, the latter having a binder receiving groove extending substantially parallel with and adjacent to the plane of the last bottom, and mechanism to operate the grippers and the last rest relatively to pull the upper and carry a toe binder toward position for use in securing the upper.

59. A machine for working an upper over a last having, in combination, a last rest, toe grippers comprising inner and outer jaws arranged in lines extending from one corner of the toe of the last around the end of the last to the other corner to receive the toe portion of the upper, said outer jaws having a groove adapted to receive a toe binder and mechanism to operate the grippers and last rest relatively to pull the upper and position the binder for use in securing the upper in pulled condition.

60. A machine for working an upper over a last having, in combination. a last rest, toe grippers comprising inner and outer jaws, the latter having a binder receiving groove extending substantially parallel with and adjacent to the plane of the last bottom, anchor tack driving means, and mechanism for operating said parts relatively to grip and pull the upper, position the binder relatively to the driving means and insert anchor tacks for the binder.

61. A machine for working an upper over a last having, in combination, grippers comprising curved jaws adapted to receive the upper at the toe end and opposite sides of the forward portion of a shoe, one of said jaws having a wiping face on one side and a gripping face on the opposite side oblique to the wiping face, and a toe binder carrying groove in its edge between said gripping and wiping faces.

62. A machine of the class described having, in combination, suitable operating means, toe embracing wiper plates adapted to position a toe binder around the toe of a welt shoe and having their edges near their rear ends formed to facilitate the insertion of anchor tacks between the binder and the body of the wiper plates, and additional means to engage the upper and hold it inside the edge line of the wipers in position to receive the anchor tacks.

63. A machine of the class described having, in combination, suitable operating means, toe embracing wiper plates adapted to position a toe binder around the toe of a welt shoe and having their edges near their rear ends formed to facilitate the insertion of anchor tacks between the binder and the body of the wiper plates, and anchor tack inserting means arranged to drive anchor tacks in the described relation to the binder and plates.

64. A machine of the class described having, in combination, suitable operating means, toe embracing wiper plates adapted to position a toe binder around the toe of a welt shoe and having their edges near their rear ends formed to facilitate the insertion of anchor tacks between the binder and the body of the wiper plates, and pressers movable across the margin of the shoe bottom adjacent to the location for the anchor tacks to force the fringe of the upper out of the way for the tack inserting operation.

65. A machine of the class described having, in combination, suitable operating means, toe embracing wiper plates having projections near their rear ends which extend substantially perpendicular to their acting faces, and shoe side engaging clamps movable in said projections substantially parallel with said acting faces.

66. A machine of the class described having, in combination with suitable operating means, grippers comprising coöperating jaws and means carried by one jaw for pushing the upper from between the jaws when the jaws are opened.

67. A machine of the class described having, in combination with suitable operating means, grippers comprising coöperating jaws formed and arranged to receive the upper of the forepart of a shoe from one side of the toe around the end of the toe to the other side and to pull the upper toward position to be secured by a toe binding wire and anchor tacks, and means to push the upper from between the jaws at the opposite sides of the toe only and hold it in position for the anchor tacks to be inserted through it into the shoe innersole while the upper at the end of the toe remains in the jaws.

In testimony whereof I have signed my name to this specification in the presence of two subscribing witnesses.

ELI BROTHERS.

Witnesses:
CHARLES H. HOYT,
ARTHUR L. RUSSELL.

It is hereby certified that in Letters Patent No. 1,135,948, granted April 13, 1915, upon the application of Eli Brothers, of Lynn, Massachusetts, for an improvement in "Machines for Use in the Manufacture of Boots and Shoes," errors appear in the printed specification requiring correction as follows: Page 7, line 98, claim 29, for the word "tackers" read *tacker;* page 9, line 80, claim 56, for the word "mechanism" read *mechanisms;* and that the said Letters Patent should be read with these corrections therein that the same may conform to the record of the case in the Patent Office.

Signed and sealed this 25th day of January, A. D., 1916.

[SEAL.]            R. F. WHITEHEAD,